July 12, 1955  S. LIGHTBOURN  2,712,855

AIRCRAFT LIFT-PROPULSION PROPELLER SYSTEM

Filed Aug. 28, 1952  3 Sheets-Sheet 1

INVENTOR.
SALVADOR LIGHTBOURN
BY
ATTORNEY

July 12, 1955 — S. LIGHTBOURN — 2,712,855
AIRCRAFT LIFT-PROPULSION PROPELLER SYSTEM
Filed Aug. 28, 1952 — 3 Sheets-Sheet 2
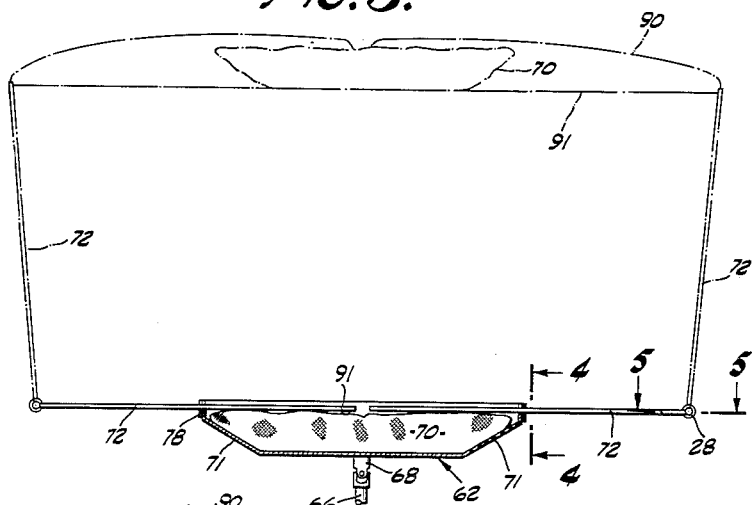
FIG. 3.
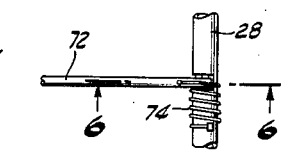
FIG. 4.
FIG. 5.
FIG. 6.
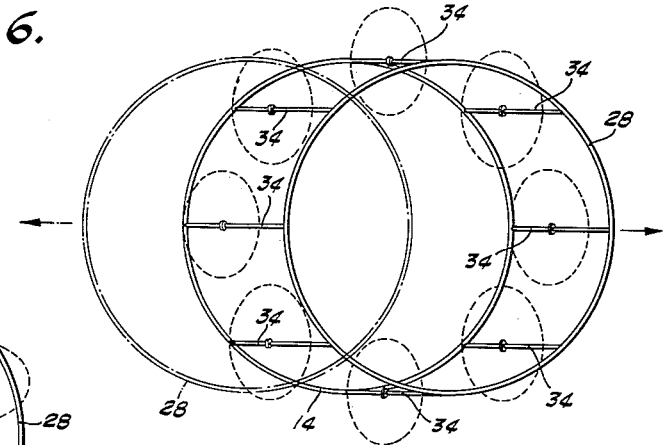
FIG. 7.
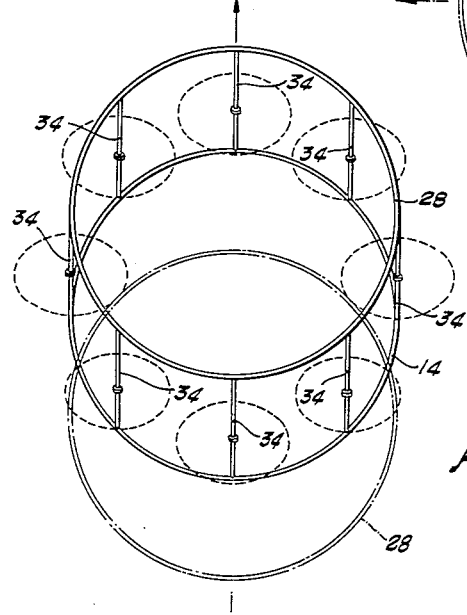
FIG. 8.
INVENTOR.
SALVADOR LIGHTBOURN
BY
ATTORNEY

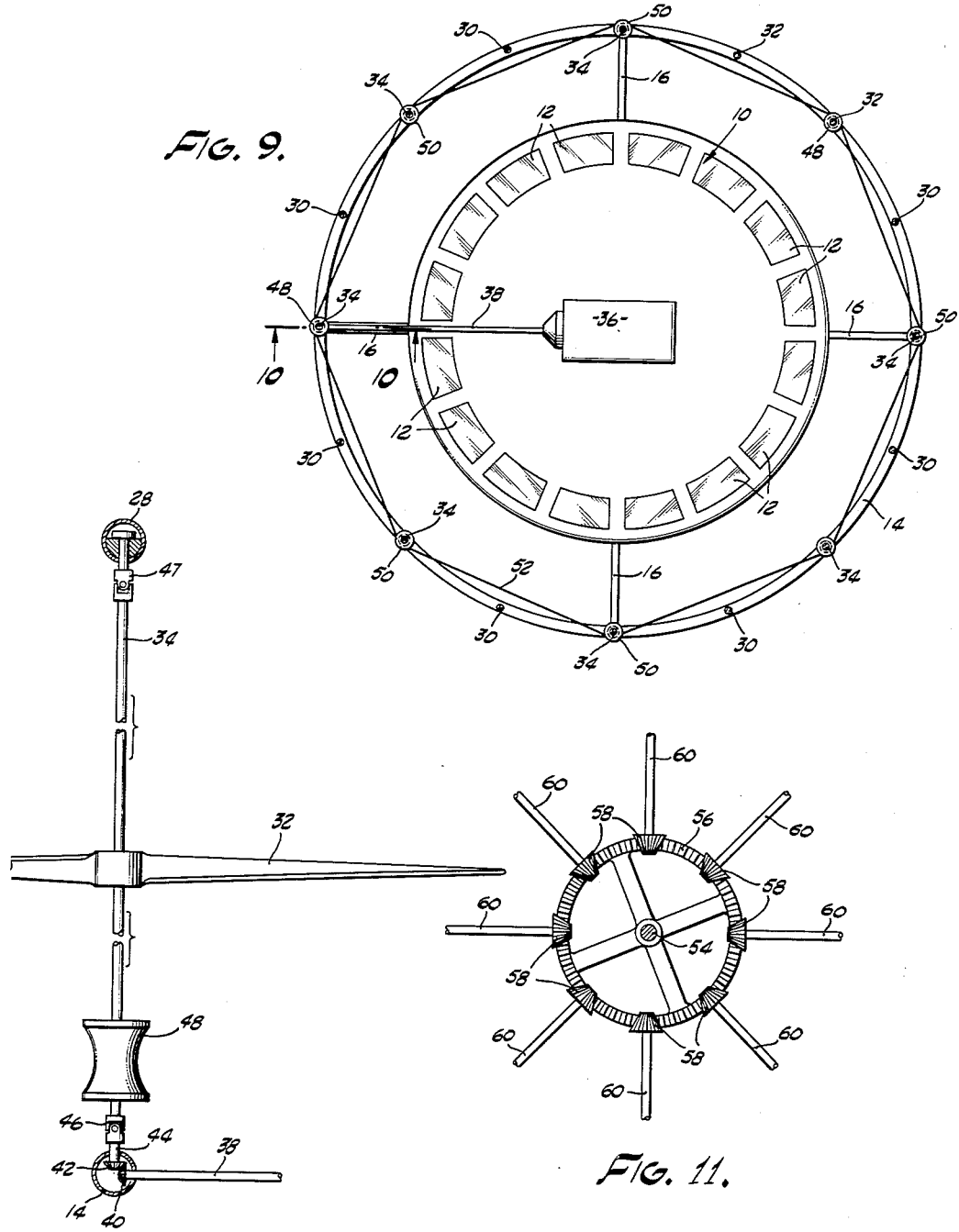

United States Patent Office 2,712,855
Patented July 12, 1955

2,712,855

AIRCRAFT LIFT-PROPULSION PROPELLER SYSTEM

Salvador Lightbourn, Los Angeles, Calif.

Application August 28, 1952, Serial No. 306,898

2 Claims. (Cl. 170—135.2)

My invention relates to heavier than air aircraft, and more particularly to a unique aircraft which is capable of moving in any direction without variation of the orientation of the aircraft with respect to the earth.

It is highly advantageous for an aircraft to have the ability to make vertical ascents and descents and to hover in one position in the air. These flight characteristics greatly reduce the danger of making take-offs and landings and also increase the utility of the aircraft. The only prior art aircraft which is capable of hovering and making vertical ascents and descents is the helicopter, which has serious limitations in its maneuverability and usefulness.

One limitation of the helicopter is that in order for the direction of flight to be changed it is necessary to swing the entire aircraft around toward the new direction of flight by means of a stabilizing propeller on the tail assembly of the helicopter. The time required to thus swing the helicopter around prevents rapid changes in the direction of flight.

In order to completely reverse the direction of flight of a helicopter, it is necessary to swing the body portion of the helicopter around a full 180 degrees, which necessitates making a sweeping turn in the same manner as an ordinary aircraft. The helicopter is incapable of merely stopping in mid-air and then backing up.

During normal flight, the helicopter must be established in a tilted attitude toward the direction of flight in order that there will be a forward component of the propeller pulling force. The amount of this tilting will vary according to the horizontal speed of the helicopter. This tilting not only presents cabin discomforts and freight handling problems, but also causes interference with the streamlining of the craft.

In view of these and many other difficulties in connection with prior art aircraft, it is an object of my invention to produce an aircraft which is capable of making vertical ascents and descents and which can move horizontally backward or forward or in any other direction without any substantial change in the orientation of the craft with respect to the earth.

Another object of my invention is to provide an aircraft which is capable of being shifted from one line of flight to another without necessitating a tilting of the aircraft.

Another object of my invention is to produce an aircraft which can be rapidly and accurately shifted from one line of flight to another.

Other objects and advantages of my invention will be apparent from the following description and claims, the novelty consisting in the features of construction, combination of parts, the unique relations of the members and the relative proportioning, disposition and operation thereof, all as is more completely outlined herein and as is particularly pointed out in the appended claims.

In the accompanying drawings, which form a part of the present application,

Figure 1:
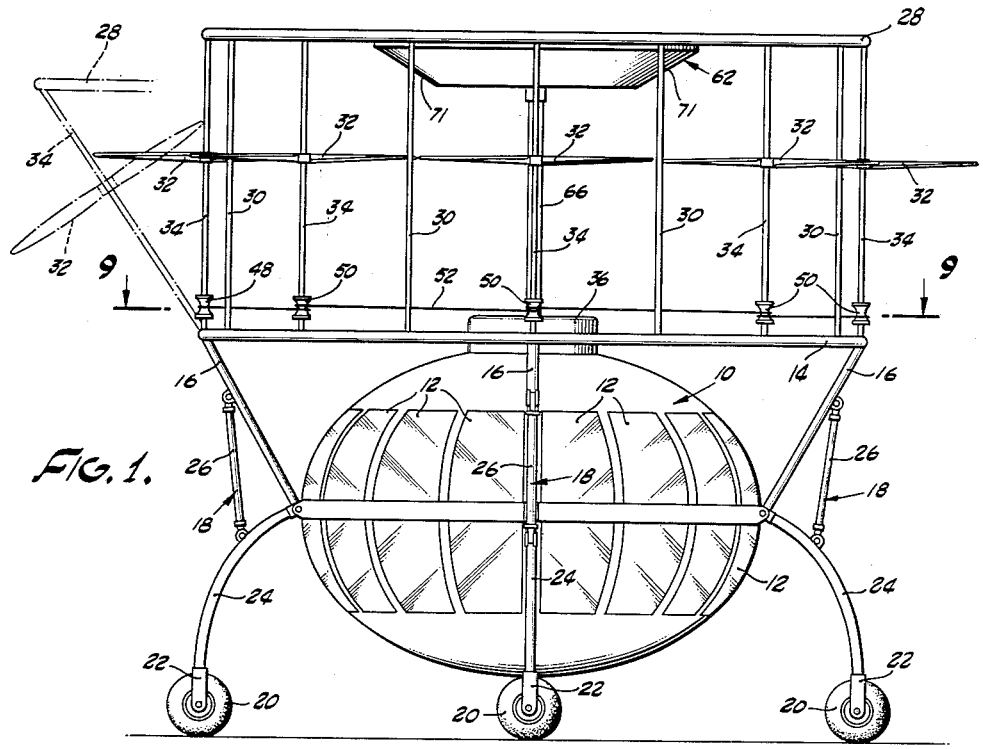
Figure 1 is a side elevation of my invention.

Figure 3 is a fragmentary sectional view showing my parachute containing and catapulting apparatus, Figure 4 is an enlarged, fragmentary sectional view along the line 4—4 in Figure 3, Figure 5 is an enlarged, fragmentary plan view along the line 5—5 in Figure 3, Figure 6 is a sectional view along the line 6—6 in Figure 5, Figure 7 is a diagrammatic plan view showing how my aircraft is steered in flight, Figure 8 is a view similar to Figure 7 with the aircraft controlled for flight in a direction normal to the direction of flight illustrated in Figure 7, Figure 9 is a horizontal section along the line 9—9 in Figure 1 illustrating my preferred apparatus for supplying power to the propellers, Figure 10 is a vertical section along the line 10—10 in Figure 9, and Figure 11 is a fragmentary view of alternative apparatus for supplying power to the respective propellers.

Figure 2:
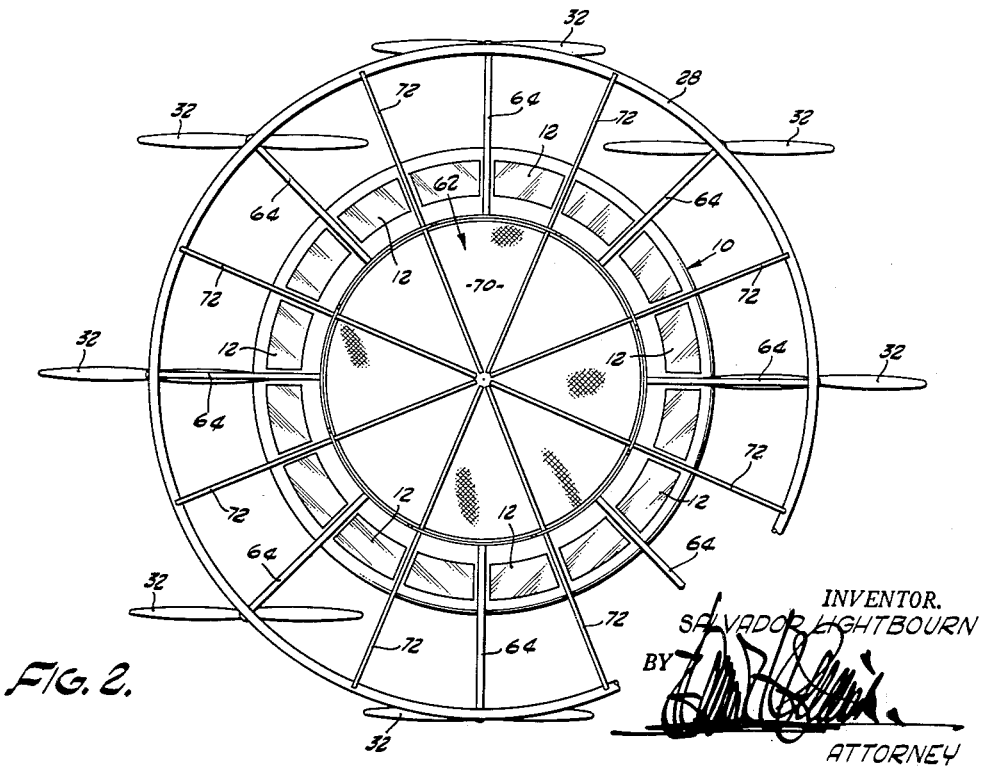
Figure 2 is a top plan view of my invention.

Referring to the drawings, and particularly to Figures 1 and 2 thereof, my aircraft includes a rounded body portion 10 which is preferably circular along a horizontal section and which is provided with a plurality of windows 12 placed at regular intervals around body portion 10.

A lower supporting ring 14 is integrally attached to body portion 10 just above and concentric to body portion 10 by means of a plurality of lower supporting ring struts 16 which extend radially outward and upward from the peripheral portion of body portion 10 to ring 14 in a manner best shown in Figure 1.

I provide a plurality of landing gear units 18 at spaced intervals around body portion 10 directly below the respective lower supporting ring struts 16 in a manner best illustrated in Figure 1. I prefer to provide four landing gear units 18 and respective supporting ring struts 16 in order to permit stable landings and to provide a strong connection between lower supporting ring 14 and body portion 10.

Each landing gear unit 18 includes a wheel 20 which is rotatably mounted in a wheel supporting member 22 that is disposed on the lower end of a curved landing gear brace 24 which is pivotally connected at its upper end to a central peripheral point on the body portion 10 which is preferably adjacent to the connection between the respective supporting ring strut 16 and body portion 10.

When landing gear units 18 are opened to the landing position, the respective landing gear braces 24 are locked in their extended positions as illustrated in Figure 1 by means of a plurality of respective enlargeable braces 26, each of which has its respective ends pivotally connected to the corresponding landing gear brace 24 and lower supporting ring strut 16.

When my craft is in the air, the respective landing gear units 18 may be collapsed or folded by merely increasing the lengths of the respective enlargeable braces 26. Braces 26 preferably consist of a piston and cylinder arrangement which can readily be actuated by any conventional hydraulic actuating mechanism (not shown). The respective landing braces 24 are curved complementarily to the outer contour of body portion 10 so that wheels 20 and braces 24 may be folded flush against the sides of body portion 10. Suitable wheel wells (not shown) may be provided in the bottom of body portion 10 to receive wheels 20.

An upper supporting ring 28 of the same diameter as lower supporting ring 14 is affixed to lower supporting ring 14 by means of a plurality of supporting ring spaced struts 30 which are disposed parallel to one another at regular intervals around supporting rings 14 and 28. Ring spacer struts 30 have equal lengths so that upper supporting ring 28 and lower supporting ring 14 will at all times be disposed in respective parallel planes. Movement of upper supporting ring 28 in any lateral direction with respect to lower supporting ring 14 is permitted by providing a universal connection between each of the supporting ring spacer struts 30 and the respective supporting rings 14 and 28.

In the preferred embodiment of my invention I provide eight spacer struts 30 which are regularly disposed around supporting rings 14 and 28 in the manner best shown in Figures 1 and 9.

I provide a plurality of propellers 32 which are operatively mounted in fixed relationship with a plurality of respective propeller shafts 34 which are rotatively mounted between lower supporting ring 14 and upper supporting ring 28. I provide the same number of propellers and respective propeller shafts as the number of spacer struts 30, and propeller shafts 34 are placed uniformly around supporting rings 14 and 28 parallel to spacer struts 30 and between the respective pairs of adjacent spacer struts 30. Thus, spacer struts 30 and propeller shafts 34 form 16 regularly spaced shafts between rings 14 and 28 in the manner shown in Figure 9.

In addition to the rotatable connections between the ends of each of the propeller shafts 34 and the respective supporting rings 14 and 28, I also provide universal connections between the ends of each of the propeller shafts 34 and the respective supporting rings 14 and 28. The universal connections between each of the shafts 34 and struts 30 and the respective supporting rings 14 and 28 permit upper supporting ring 28 to be moved laterally in any direction with respect to lower supporting ring 14 to cause a tilting of all of the propellers 32 toward one direction. If upper supporting ring 28 is shifted laterally to the left in Figure 1, then all of the propellers 32 will be tilted, parallel to one another, to the left in the manner illustrated by the tilted propeller 32 which is dotted in at the left side of Figure 1.

The respective propellers 32 are disposed on propeller shafts 34 slightly above the centers of the respective shafts 34 so that when propellers 32 are tilted in the manner illustrated at the left side of Figure 1, there will be sufficient clearance between the ends of the respective propellers 32 and the respective lower and upper supporting rings 14 and 28.

I will now describe my preferred power train for supplying rotary power to the respective propellers 32. This preferred power train is best illustrated in Figures 1, 9 and 10 of the drawings.

An engine 36 is preferably centrally disposed in the top of body portion 10 to give a centralized ballast to the aircraft.

The drive shaft 38 of engine 36 extends laterally outward from engine 36 to lower supporting ring 14 in the manner best shown in Figures 9 and 10. A bevel gear 40 is integrally attached to the outer end of engine drive shaft 38 and operatively meshes with a similar bevel gear 42 which is integrally attached to a vertical shaft 44. Although bevel gears 40 and 42 are illustrated as being disposed within lower supporting ring 14 in Figure 10, if it is desired, an enlargement may be provided in supporting ring 14 to house bevel gears 40 and 42 without decreasing the strength of lower supporting ring 14.

One of the propeller shafts 34 is operatively connected to vertical shaft 44 by means of a universal joint 46 which permits rotary power to be applied to this propeller shaft 34 from engine 36 regardless of the amount of tilting of the propeller 32 which is attached to this propeller shaft 34. A similar universal joint 47 is provided at the upper end of this propeller shaft 34 adjacent to upper supporting ring 28 in the manner shown in Figure 10.

A drive spool or pulley 48 is integrally attached to the propeller shaft 34 which is connected to engine 36 just above universal joint 46. A similar driven spool or pulley 50 is integrally attached to each of the remaining propeller shafts 34 at substantially the same distance above lower supporting ring 14 as drive spool or pulley 48.

Drive spool or pulley 48 is operatively connected to each of the respective driven spools 50 by means of a continuous drive belt 52 best illustrated in Figures 1 and 9 which is preferably wrapped a complete turn around each of the spools 48 and 50 to prevent slippage. By providing spools 48 and 50 of substantially the same size, all of the respective propellers 32 are caused to rotate at substantially the same speed.

Although I have illustrated operative connections between drive belt 52 and the respective driven spools 50 which will cause all of the propellers to rotate in the same direction, if it is desired, drive belt 52 may be wound around any of the spools 50 in the opposite direction to cause counter-rotation of any one or more of the propellers 32.

An alternative power train for my aircraft in which each of the respective propellers 32 is driven by independent mechanical connections to engine 36 is illustrated in Figure 11 of the drawings. In this embodiment of my invention I provide a vertically disposed drive shaft 54 which is suitably operatively connected to the output shaft of engine 36. Engine 36 may be moved to a lower position in body portion 10 than that shown in Figure 1 to provide room for shaft 54 above engine 36. Integrally attached at or near the upper end of vertical drive shaft 54 is a bevel ring gear 56 which drives a plurality of bevel gears 58 disposed at regular intervals around ring gear 56 and operatively meshing with ring gear 56. One bevel gear 58 is provided for each of the respective propellers 32.

A plurality of intermediate drive shafts 60 support the respective bevel gears 58 at their inner ends and extend radially outward to lower supporting ring 14 in exactly the same manner that drive shaft 38 shown in Figures 9 and 10 extends radially outward from engine 36 to lower supporting ring 14. Each of the respective intermediate drive shafts 60 is mechanically coupled with its respective propeller 32 in the same manner that drive shaft 38 is mechanically coupled to its respective propeller 32.

Thus, rotation of vertical drive shaft 54 and the corresponding rotation of ring gear 56 causes rotation of all the bevel gears 58 at the same speed and in the same direction, which in turn causes rotation of all of the propellers 32 at the same speed and in the same direction.

If it is desired to cause counter-rotation of one or more of the propellers 32 when my alternative power train mechanism illustrated in Figure 11 is used, it is merely necessary to operatively engage one or more of the bevel gears 58 with the downwardly directed teeth of an additional bevel gear (not shown) operatively connected to vertical drive shaft 54 or to downwardly directed teeth (not shown) on the lower side of bevel ring gear 56 illustrated in Figure 11.

In order to steer my aircraft it is merely necessary to move upper supporting ring 28 laterally with respect to lower supporting ring 14 in the direction of the desired direction of flight. This will cause all of the propellers 32 to be tilted in the direction of flight so that they will produce a horizontal force component which will drive the aircraft in the desired direction of flight.

This horizontal displacement of upper supporting ring 28 with respect to lower supporting ring 14 is achieved by an independent mechanical connection between upper supporting ring 28 and body portion 10. Included in this independent mechanical connection is a parachute container or other central member 62 which is integrally attached to upper supporting ring 28 at its center by means of a plurality of horizontally supporting braces 64 which extend radially outwardly from central member 62 to upper supporting ring 28.

A central steering shaft 66 is universally but not rotatively connected to central member 62 by means of steering universal 68 and extends downwardly from central member 62 to body portion 10. Steering shaft 66 is locked against rotation in body portion 10 in order to prevent relative rotation between upper and lower supporting rings 28 and 16, respectively.

Suitable control apparatus (not shown) is provided inside of body portion 10 to permit steering shaft 66 to be tilted in any direction. Any tilting of steering shaft 66 will cause a corresponding lateral disposition of upper supporting ring 28 with respect to lower supporting ring 14 and hence a tilting of propellers 32.

Although any central member 62 may be integrally attached to upper supporting ring 28 for steering purposes, I prefer to provide a central member 62 which is adapted to contain a parachute 70 which is best illustrated in Figures 2 and 3. Parachute container 62 is sufficiently large to contain a relatively large parachute 70 that is capable of supporting the entire aircraft together with its occupants and cargo, and container 62 is preferably circular in the manner shown in Figure 2 with beveled edges 71 shown in Figure 3.

I provide a plurality of hollow catapult arms 72 which are pivotally mounted on upper supporting ring 28 at regular intervals around upper supporting ring 28. Catapult arms 72 are normally urged to pivot about upper supporting ring 28 from their normal horizontal radially disposed position illustrated in Figures 2 and 3 toward a vertical or slightly greater than vertical position such as that shown by dotted lines in Figure 3 by means of respective helical springs 74 which have one end integrally attached to upper supporting ring 28 and the other end integrally attached to the respective catapult arms 72.

Catapult arms 72 are normally held down in their horizontal positions shown in Figures 2 and 3 by engagement of catapult arms 72 in respective slots 76 adjacent to the upper edge of a circular parachute release collar 78, as is best shown in Figures 3 and 4. Parachute release collar 78 is rotatably mounted around the upper edge of parachute container 62 and is retained in its operative position by engagement of a plurality of pins integrally attached to parachute container 62 with a plurality of respective slots 82 through parachute release collar 78.

A rip-cord 84 extends upwardly from body portion 10 of the aircraft to an eye 86 affixed to parachute container 62 from which cord 84 extends laterally and upwardly to its point of connection 88 with parachute release collar 78.

A downward pull on rip-cord 84 causes rotation of parachute release collar 78 so that pin 80 moves from one end of slot 82 to the other end. This causes catapult arms 72 to move out of their respective slots 76 in collar 78 so that springs 74 can swing their respective catapult arms 72 upward to the position shown by dotted lines in Figure 3. A plurality of parachute lines 90 which are integrally attached to parachute 70 pass through the respective tubular catapult arms 72 and are anchored at the pivoting ends of catapult arms 72 in the manner hereinafter described. A plurality of catapult lines 91 are anchored to the respective ends of diametrically opposed pairs of catapult arms and are positioned underneath parachute 70 when the parachute is in its folded position in container 62. The outward and upward swing of the inwardly directed ends of catapult arms 72 when the rip-cord is pulled flings parachute 70 upward away from the aircraft by means of catapult lines 91 to the position illustrated in dotted lines in Figure 3 where the parachute will readily be opened by the rush of air and the pull on parachute lines 90 which will be hereinafter described.

Referring now to Figure 6 of the drawings, each of the respective parachute lines 90 passes through the respective tubular catapult arm 72 and out of the respective catapult arm 72 through a lateral passage therein near upper supporting ring 28. Each of the lines 90 is prevented from scraping its respective catapult arm 72 at the point where it leaves the base of arm 72 by means of suitable rollers 92 which are rotatively mounted adjacent to the passage through the wall of the respective catapult arm 72.

Each of the parachute lines 90 then extends below upper supporting ring 28 and is wound on a parachute line magazine 94 which is spring loaded in the conventional manner to continually apply a tension to its respective parachute line 90. Each of the respective magazines 94 is mounted upon a suitable brace 96 which extends downwardly from upper supporting ring 28. The tension applied to parachute lines 90 by the respective magazines 94 is sufficient to open up parachute 70 as soon as parachute 70 is catapulted upward by catapult lines 91 upon the release of catapult arms 72 when rip-cord 84 is actuated.

For take-offs, upper supporting ring 28 is positioned directly above lower supporting ring 14 in the manner shown in Figures 1 and 2 so that propellers 32 will pull the aircraft vertically upward from the ground.

As soon as the aircraft is above the ground, the landing gear can be folded under the body portion 10 to increase the streamlining of the aircraft.

After sufficient altitude has been obtained in the vertical ascent, horizontal movement of my aircraft may be achieved by merely tilting steering shaft 66 in the desired direction of flight. This will cause a consequent displacement of upper supporting ring 28 towards the direction of flight with respect to the lower supporting ring 14, and a resulting tilting of the propellers 32 toward the direction of flight.

A sufficient upward component of the propeller pull is at all times maintained to keep the aircraft in level, climbing or diving flight according to whichever is desired. The climb or dive of the aircraft is not only controlled by the amount of vertical component of the propeller pull due to tilting of propellers 32, but also by the amount of power which is supplied to propellers 32 from engine 36.

Referring to Figure 7 of the drawings, if the desired direction of flight is to the right, then upper supporting ring 28 will be disposed to the right with respect to lower supporting ring 14 in the solid line position of upper supporting ring 28 in Figure 7. On the other hand, if it is desired to fly my aircraft to the left in Figure 7, upper supporting ring 28 will be disposed to the left of lower supporting ring 14 in a position illustrated by the dotted line supporting ring 28 in Figure 7. In order to shift my aircraft from a flight direction to the right to a flight direction to the left in Figure 7, it is merely necessary to move steering shaft 66 to shift upper supporting ring 28 from its solid line position to its dotted line position in Figure 7. This permits me to stop my aircraft in mid-air and reverse the direction of flight without going through a wide 180 degree turn.

Referring now to Figure 8 of the drawings, if it is desired to fly my aircraft in a direction at right angles to either of the directions of flight illustrated in Figure 7, it is merely necessary to move upper supporting ring 28 to either the solid line position or the dotted line position in Figure 8, these positions respectively causing upward and downward flight directions in Figure 8.

It can readily be seen that by proper manipulation of steering shaft 66 and of the throttle control mechanism (not shown) for engine 36, my aircraft can be moved in a vertical ascent or descent, can be caused to hover in one position in the air, can be moved laterally in any direction without any substantial change in the orientation direction of body portion 10 or can be dived or climbed in any direction without tilting body portion 10 from its upright position illustrated in Figure 1.

A rapid shift in the direction of flight or a rapid reversal in the direction of flight of my aircraft can be accomplished by simply moving steering shaft 66 toward the desired new direction of flight from its former position which was toward the old direction of flight. The direction of flight is thus changed without the necessity of banking or tilting the aircraft, and without awaiting a change in the orientation direction of body portion 10.

It is to be understood that the form of my invention herein shown and described is my preferred embodiment and that various changes in the shape, size and arrangement of parts may be resorted to without departing from the spirit of my invention or the scope of the appended claims.

I claim:

1. An aircraft including a body portion, an engine supported by said body portion, upper and lower propeller shaft supporting rings which are shiftable laterally with respect to each other operatively connected to said body portion, a plurality of propeller shafts rotatably mounted between said upper and lower supporting rings at spaced intervals around said supporting rings, a plurality of propellers operatively mounted on the respective said propeller shafts and operative connections between the respective said propeller shafts and said engine.

2. An aircraft including a body portion, an engine supported by said body portion, upper and lower propeller shaft supporting members which are shiftable laterally with respect to each other operatively connected to said body portion, a plurality of circularly arranged propeller shafts rotatably mounted between said upper and lower supporting members at spaced intervals, a plurality of propellers operatively mounted on the respective said propeller shafts and operative connections between the respective said propeller shafts and said engine.

References Cited in the file of this patent

UNITED STATES PATENTS

| Number | Name | Date |
|---|---|---|
| 982,647 | Vaniman | Jan. 24, 1911 |
| 1,035,583 | Hamilton | Aug. 13, 1912 |
| 1,508,016 | Ellis | Sept. 9, 1924 |
| 1,853,874 | Monteleone | Apr. 12, 1932 |
| 1,900,891 | Crane | Mar. 7, 1933 |
| 1,995,083 | Van Geons | Mar. 19, 1935 |
| 2,381,021 | Wood | Aug. 7, 1945 |
| 2,428,475 | Swaab | Oct. 7, 1947 |

FOREIGN PATENTS

| Number | Country | Date |
|---|---|---|
| 395,620 | France | Jan. 4, 1909 |